United States Patent [19]
Zettl

[11] Patent Number: 4,461,602
[45] Date of Patent: Jul. 24, 1984

[54] MILLING CUTTER

[76] Inventor: Otto Zettl, Fellenbergstrasse 9, Reicholzried, Fed. Rep. of Germany

[21] Appl. No.: 439,465

[22] Filed: Nov. 5, 1982

[30] Foreign Application Priority Data

Jul. 1, 1982 [DE] Fed. Rep. of Germany ....... 3200191

[51] Int. Cl.$^3$ ............................................. B26D 1/12
[52] U.S. Cl. ...................................... 407/40; 407/42; 407/48; 407/53
[58] Field of Search ....................... 407/48, 40, 42, 64, 407/65, 104, 33, 34, 51; 408/187, 188, 198, 223, 224, 713; 279/8

[56] References Cited

U.S. PATENT DOCUMENTS

| | | | |
|---|---|---|---|
| 559,012 | 4/1896 | Warren | 407/33 |
| 3,130,426 | 4/1964 | Holzer | 407/64 |
| 3,633,258 | 1/1972 | Szabo | 407/48 |

FOREIGN PATENT DOCUMENTS

| | | | |
|---|---|---|---|
| 454092 | 1/1950 | Italy | 407/33 |
| 197811 | 11/1978 | United Kingdom | 407/104 |

*Primary Examiner*—Leonidas Vlachos
*Attorney, Agent, or Firm*—Kuhn, Muller and Bazerman

[57] ABSTRACT

A milling cutter consists of a shaft 10, a cutter plate 12 and a screw bolt 14 by means of which the cutter plate 12 is detachably fastened at the front end of the shaft 10. The latter has a recess in the front face thereof. The recess is defined by three planar side faces leaving a peripheral gap between each pair thereof. The cutter plate substantially formed triangularly is fitted in the recess for being inmovable in a radial plane. Protrusions 30 of the cutter plate protrude through the gaps and are provided with a cutting edge respectively.

5 Claims, 4 Drawing Figures

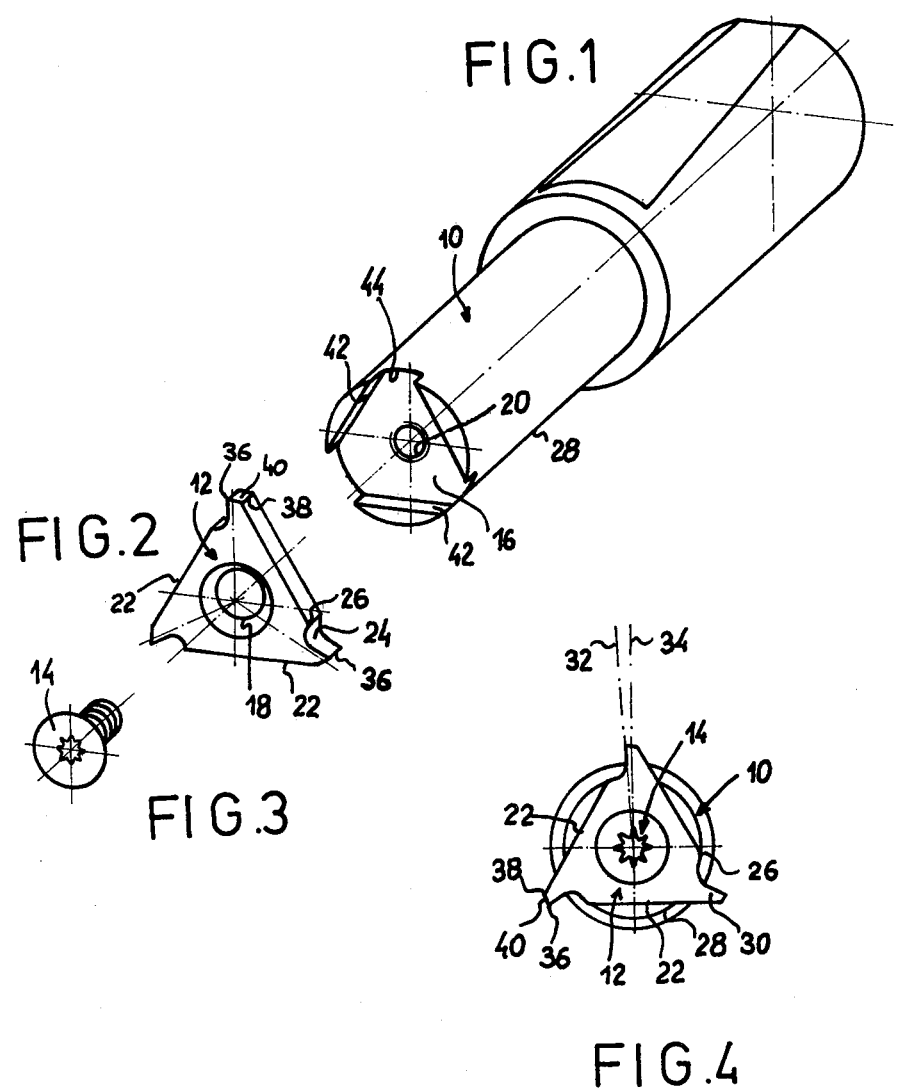

MILLING CUTTER

BACKGROUND OF THE INVENTION

The invention relates to a milling cutter comprising a shaft and a cutter plate, the cutter plate provided with a central bore and with a plurality of peripherally spaced teeth concentrically arranged with respect to the bore, a screw or a screw bolt extending through said central bore for detachably fastening the cutter plate at the front face of the shaft; the shaft provided with a recess at the front side thereof.

A milling cutter of this kind is known (DE-U-7012169). A pair of recesses in form of drill holes are provided oppositely with respect to a central thread bolt protruding from the shaft. The cutter plate is provided with a pair of axial pins engaging into the drill holes when the cutter plate is mounted.

BRIEF SUMMARY OF THE INVENTION

One object of the invention is to provide a milling cutter of the type mentioned above which can be more economically produced, which allows a simple interchange of cutter plates maintaining the shaft and which provides for a stable connection of the cutter plate on the shaft even in the case of small diameter milling cutters.

A further object of the invention is to provide a novel milling cutter in which the cutter plate provided with a non-circular periphery is non-rotatably inserted in a front-side recess of the shaft.

A further object of the invention is to provide a milling cutter in which the shape of the inner periphery of the recess is equal with that of the outer periphery of the cutter plate within the area of the front end diameter of the shaft.

Other objects and advantages will become apparent from the following description and the drawings.

BRIEF DESCRIPTION OF THE DRAWINGS

FIG. 1 is a perspective view of a so-called whistle-notch shaft;

FIG. 2 is a perspective view of a cutter plate;

FIG. 3 is a perspective view of a fastening screw; and

FIG. 4 is a front view of a milling cutter composed of the three pieces according to FIGS. 1 to 3.

DESCRIPTION OF A PREFERRED EMBODIMENT

A milling cutter is composed of a shaft 10, a cutter plate 12 and a screw 14. The shaft 12 has a front-side recess 16 into which the cutter plate is fitted. The cutter plate 12 has a central bore 18 and the shaft 10 has a central tap hole 20.

The cutter plate 12 is provided with three planar side faces 22 forming the sides of an equilateral triangle the center of which coinciding with the axis of the central bore 18. One end of each planar side face 22 is formed by an edge 26 which exactly lies on the outer diameter of the cylindrical shaft front end 28. A concave cutting face 24 adjoins the edge 26 and at the outer end thereof a cutting edge 36 is formed. The other end of each planar side face 22 extends beyond the outer diameter of the shaft end 28 and ends at an edge 38 which lies on or slightly inside of the diameter of the cutting edge 36. Between the edges 36, 38 a peripheral face 40 is formed. Consequently the cutter plate 12 has three teeth 30 extending outwards from the shaft front end diameter. Each tooth 30 has a front-side concave cutting face 24 and back-side planar face.

The outer end of the concave face 24 approaches tangentially an imaginary axial plane 32 which forms a slight angle with a second axial plane 34 which is perpendicular to the opposed side face 22, provided that said plane 32, 34 intersect one another in the axis of the central bore 18.

The recess 16 has three planar side faces 42 ending at the shaft peripheral surface respectively. Between adjacent ends of each pair of that side faces 42 a gap 44 is formed respectively. The side face 42 coincide with the sides of an equilateral triangle which is congruent with the triangle of the side faces 22 of the cutter plate 12. Consequently three projections are formed at the front end of the shaft, bordered at the outer side by the cylindrical periphery of the shaft end 28 and at the inner side by the planar face 42 respectively. The peripheral dimension of each gap 44 is equal with the peripheral interspace of the cutter plate 12 between the edge 26 and an intersection of a circle with the diameter of the shaft end 28 and the rearward side face 22 of each tooth 30 respectively.

Therefore the cutter plate 12 snuggly fits in and completely fills up the recess 16 and the teeth 30 protrude outwards through the gaps 44 formed between each pair of projections. The cutter plate 12 after insertion into the recess 16 is immovably held therein and the screw 14 serves only as an axial fastening means.

I claim:

1. A milling cutter comprising a shaft and a cutter plate, the cutter plate provided with a central bore and with a plurality of peripherally spaced teeth concentrically arranged with respect to the bore, a screw or a screw bolt extending through said central bore in said cutter plate and into a tap hole coaxially arranged in the front end of the shaft for detachably fastening the cutter plate at the front face of the shaft; the shaft provided with a recess at the front side thereof, the periphery of the recess defined by three planar inside surfaces coinciding with the sides of an equilateral triangle symmetrically arranged with respect to the central bore, a gap provided between each pair of adjacent planar inside surfaces on the shaft front end diameter, the cutter plate provided with three planar outside surfaces, coinciding with the sides of said equilateral triangle, one tooth formed between extensions of each pair of planar outside surfaces of the cutter plate, the cutter plate fitted in the recess such that each one of said three outside surfaces of the cutter plate contacts one of said three inside surfaces of the recess thereby completely filling up the recess and only the teeth protruding outwards through said gaps.

2. A milling cutter as claimed in claim 1, wherein one extension of each planar outside surface of the cutter plate is in a straight line with that planar outside surface and forms the rearward side of one tooth and wherein the extension at the other end of that planar outside surface is concavely shaped and forms a cutting face of another tooth.

3. A milling cutter as claimed in claim 2, wherein the outer end of the concave cutting face of the tooth approaches tangentially outwards an imaginary radial line of the cutter plate.

4. A milling cutter as claimed in claim 2, wherein the inner end of the concave cutting face and the outside end of the adjacent planar outside surface of the cutter plate meet one another on the shaft front end diameter.

5. A milling cutter as claimed in claim 1, wherein the depth of the recess is substantially equal with the constant thickness of the cutter plate in the area of the shaft front end diameter.

* * * * *